United States Patent
Kuroda et al.

(10) Patent No.: US 12,092,552 B2
(45) Date of Patent: Sep. 17, 2024

(54) HOSE REMAINING LIFETIME PREDICTION METHOD AND HOSE REMAINING LIFETIME PREDICTION SYSTEM

(71) Applicant: BRIDGESTONE CORPORATION, Tokyo (JP)

(72) Inventors: Taisuke Kuroda, Tokyo (JP); Yuji Kumagai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 30 days.

(21) Appl. No.: 17/596,028

(22) PCT Filed: Jun. 1, 2020

(86) PCT No.: PCT/JP2020/021665
§ 371 (c)(1),
(2) Date: Dec. 2, 2021

(87) PCT Pub. No.: WO2020/255694
PCT Pub. Date: Dec. 24, 2020

(65) Prior Publication Data
US 2022/0316979 A1 Oct. 6, 2022

(30) Foreign Application Priority Data

Jun. 19, 2019 (JP) .................. 2019-113631
Aug. 15, 2019 (JP) .................. 2019-149082

(51) Int. Cl.
*G01M 5/00* (2006.01)
*E02F 9/22* (2006.01)
(Continued)

(52) U.S. Cl.
CPC ......... *G01M 5/0033* (2013.01); *E02F 9/2275* (2013.01); *E02F 9/267* (2013.01); *F16L 11/081* (2013.01); *G01M 5/0025* (2013.01)

(58) Field of Classification Search
CPC . G01M 5/0033; G01M 5/0025; E02F 9/2275; F16L 11/081
See application file for complete search history.

(56) References Cited

U.S. PATENT DOCUMENTS 5,056,928 A * 10/1991 Aoki .............. G01N 25/18
374/163
2016/0003723 A1 1/2016 Chapman
2018/0180512 A1* 6/2018 Suzuki ............. G01M 5/0058

FOREIGN PATENT DOCUMENTS

JP 0052466 B1 * 2/1985
JP H09119584 A 5/1997
(Continued)

OTHER PUBLICATIONS

Machine translation of JP09194793A (Year: 1997).*
(Continued)

*Primary Examiner* — Alexander Satanovsky
*Assistant Examiner* — Sangkyung Lee
(74) *Attorney, Agent, or Firm* — KENJA IP LAW PC

(57) ABSTRACT

A method and system for easily predicting a remaining lifetime of a hose are provided. A hose remaining lifetime prediction method and a hose remaining lifetime prediction system, for predicting a remaining lifetime of a hose 1 in use, include obtaining in advance, for a hose of the same type, relationship between use time of an inner tubular rubber layer 11 at a reference temperature and a physical property value of rubber forming the inner tubular rubber layer 11, generating a thermal degradation model for the inner tubular rubber layer 11, calculating, for the hose 1 in use, reference temperature use time being use time of the inner tubular rubber layer 11 at the reference temperature until a time of the prediction, and predicting the remaining lifetime of the hose 1 in use, based on comparison between
(Continued)

the reference temperature use time and the thermal degradation model.

6 Claims, 12 Drawing Sheets

(51) Int. Cl.
*E02F 9/26* (2006.01)
*F16L 11/08* (2006.01)

(56) References Cited

FOREIGN PATENT DOCUMENTS

| JP | 09194793 | A | * | 7/1997 |
|---|---|---|---|---|
| JP | 2003215023 | A | * | 7/2003 |
| JP | 2003215023 | A | | 7/2003 |
| JP | 3926156 | B2 | * | 6/2007 |
| JP | 2007263908 | A | | 10/2007 |
| JP | 2012507032 | A | | 3/2012 |
| JP | 2014062876 | A | | 4/2014 |
| JP | 2015010875 | A | | 1/2015 |
| JP | 2018072027 | A | | 5/2018 |
| KR | 100899979 | B1 | * | 6/2009 |
| WO | 2010062329 | A1 | | 6/2010 |

OTHER PUBLICATIONS

Machine translation of JP203215023A (Year: 2003).*
Machine translaton of JP3926156B2 (Year: 2007).*
Machine translation of EP0052466B1 (Year: 1985).*
Machine translation of KR100899979B1 (Year: 2009).*
Dec. 21, 2021, International Preliminary Report on Patentability issued in the International Patent Application No. PCT/JP2020/021665.
Aug. 11, 2020, International Search Report issued in the International Patent Application No. PCT/JP2020/021665.
Jun. 16, 2023, search result of the Extended European Search Report issued by the European Patent Office in the corresponding European Patent Application No. 20827905.9.

* cited by examiner

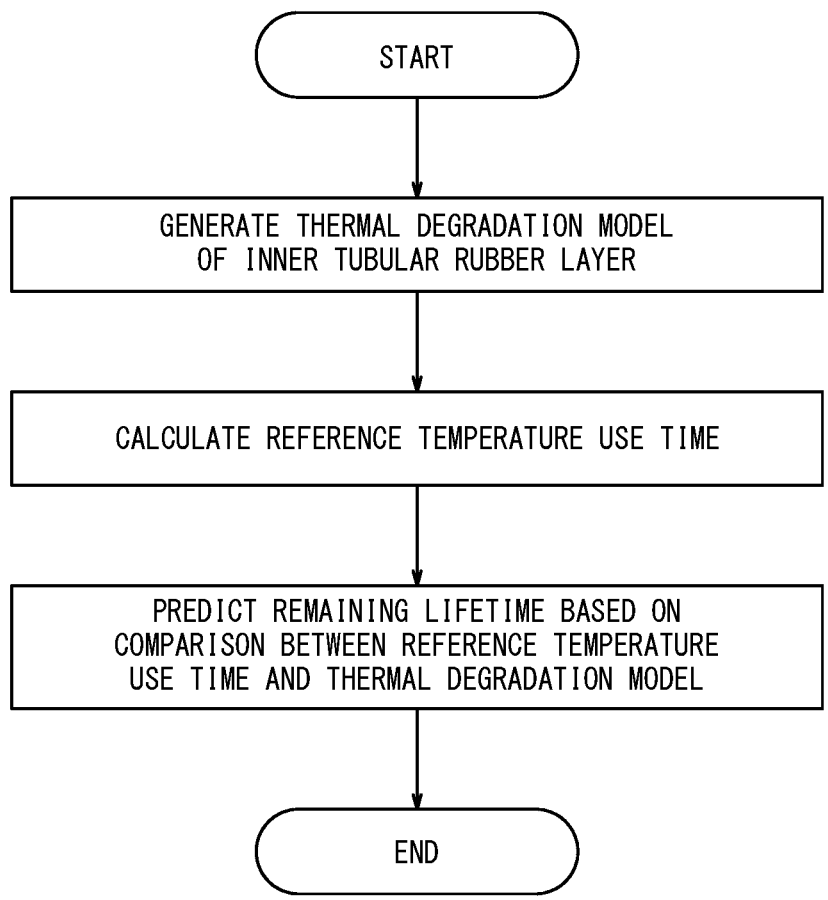

HOSE REMAINING LIFETIME PREDICTION METHOD AND HOSE REMAINING LIFETIME PREDICTION SYSTEM

TECHNICAL FIELD

The disclosure relates to a hose remaining lifetime prediction method and a hose remaining lifetime prediction system.

BACKGROUND

In general, hoses having inner tubular rubber layers are sometimes used in construction machinery, factory equipment, and the like to transmit pressure using high-temperature and high-pressure fluids (such as oil). The rubber layers of such hoses are gradually degraded over long periods of time, even when the hoses are used within ranges specified by specifications of the hoses. A hose that is used beyond its lifetime, regardless of degradation in a rubber layer, may cause a problem such as, for example, a fluid inside the hose leaking out from between a joint and the hose. In particular, in a case in which the hose is suddenly broken, the fluid may splatter, and furthermore a non-operational period of construction machinery, factory equipment, or the like may occur. In order to prevent such a problem, it has been proposed that a hose in use be inspected and its remaining usable period be predicted so that use of the hose does not exceed its lifetime.

For example, Patent Literature (PTL) 1 proposes a method for predicting a remaining lifetime of a hose by measuring, in real time, a range of peak pressure in the hose and the temperature of a fluid when the peak pressure occurs in the hose, calculating damage caused to the hose by the peak pressure and the temperature of the fluid, and accumulating the calculated damage.

CITATION LIST

Patent Literature

PTL 1: JP 2012-507032 A

SUMMARY

Technical Problem

However, the above conventional method requires monitoring of both pressure and temperature, which leads to cost increase and lacks simplicity.

It could be helpful to provide a hose remaining lifetime prediction method and a hose remaining lifetime prediction system, which can easily predict a remaining lifetime of a hose.

Solution to Problem

The gist of the disclosure is as follows.

A hose remaining lifetime prediction method according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction method includes:

a thermal degradation model generation step for obtaining in advance, for a hose of a same type as the hose in use, relationship between use time of the inner tubular rubber layer at a reference temperature and a physical property value of rubber forming the inner tubular rubber layer, and generating a thermal degradation model for the inner tubular rubber layer;

a reference temperature use time calculation step for calculating, for the hose in use, reference temperature use time being use time of the inner tubular rubber layer at the reference temperature until a time of the prediction; and a remaining lifetime prediction step for predicting the remaining lifetime of the hose in use, based on comparison between the reference temperature use time calculated in the reference temperature use time calculation step and the thermal degradation model generated in the thermal degradation model generation step.

A hose remaining lifetime prediction method according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction method includes:

a degraded state reaching use time calculation step for calculating in advance, for a hose of a same type as the hose in use, use time required for the inner tubular rubber layer to reach a predetermined degraded state at each temperature;

a measurement step for measuring, for the hose in use, actual use time of the inner tubular rubber layer at each temperature;

a thermal load calculation step for calculating a thermal load at each temperature, based on the actual use time at each temperature measured in the measurement step and the use time required to reach the predetermined degraded state at each temperature; and a remaining lifetime prediction step for setting a time when a total thermal load, being a summation of the thermal loads at every temperature, reaches a predetermined upper limit as a lifetime of the hose in use, and predicting the remaining lifetime of the hose in use based on relationship between the predetermined upper limit and the total thermal load at a time of the prediction.

A hose remaining lifetime prediction method according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction method includes:

a thermal degradation model generation step for obtaining in advance, for a hose of a same type as the hose in use, relationship at each temperature between use time of the inner tubular rubber layer and a physical property value of rubber forming the inner tubular rubber layer, and generating a thermal degradation model for the inner tubular rubber layer;

a measurement and recording step for measuring temperature during use of the inner tubular rubber layer and recording, together with the temperature, use time at the temperature, until a time of the prediction;

a thermal degradation point identification step for identifying, in the thermal degradation model, a thermal degradation point of the inner tubular rubber layer at the time of the prediction, based on the thermal degradation model generated in the thermal degradation model generation step and the temperature and the use time recorded in the measurement and recording step; and a remaining lifetime prediction step for setting a threshold for the physical property value as a limit of use of the inner tubular rubber layer, and predicting the remaining lifetime of the hose in use based on the threshold and the thermal degradation point identified in the thermal degradation point identification step.

A hose remaining lifetime prediction system according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction system includes:

a thermal degradation model generation unit configured to obtain in advance, for a hose of a same type as the hose in use, relationship at a reference temperature between use time of the inner tubular rubber layer and a physical property value of rubber forming the inner tubular rubber layer, and generate a thermal degradation model for the inner tubular rubber layer;

a reference temperature use time calculation unit configured to calculate, for the hose in use, reference temperature use time being use time of the inner tubular rubber layer at the reference temperature until a time of the prediction; and a remaining lifetime prediction unit configured to predict the remaining lifetime of the hose in use, based on comparison between the reference temperature use time calculated by the reference temperature use time calculation unit and the thermal degradation model generated by the thermal degradation model generation unit.

A hose remaining lifetime prediction system according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction system includes:

a degraded state reaching use time calculation unit configured to calculate, for a hose of a same type as the hose in use, use time required for the inner tubular rubber layer to reach a predetermined degraded state at each temperature;

a measurement unit configured to measure, for the hose in use, actual use time at each temperature;

a thermal load calculation unit configured to calculate a thermal load at each temperature, based on the actual use time at each temperature measured by the measurement unit and the use time required to reach the predetermined degraded state at each temperature; and a remaining lifetime prediction unit configured to set a time when a total thermal load, being a summation of the thermal loads at every temperature, reaches a predetermined upper limit, as a lifetime of the hose in use, and predict the remaining lifetime based on relationship between the predetermined upper limit and the total thermal load at a time of the prediction.

A hose remaining lifetime prediction system according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction system includes:

a thermal degradation model generation unit configured to obtain, for a hose of a same type as the hose in use, relationship at each temperature between use time of the inner tubular rubber layer and a physical property value of rubber forming the inner tubular rubber layer, and generate a thermal degradation model for the inner tubular rubber layer;

a sensor unit configured to measure temperature during use of the inner tubular rubber layer until a time of the prediction, and a measurement and recording unit configured to record, together with the temperature, use time at the temperature;

a thermal degradation point identification unit configured to identify, in the thermal degradation model, a thermal degradation point of the inner tubular rubber layer at the time of the prediction, based on the thermal degradation model generated by the thermal degradation model generation unit and the temperature and the use time recorded in the measurement and recording unit; and a remaining lifetime prediction unit configured to set a threshold for the physical property value of the rubber forming the inner tubular rubber layer as a limit of use of the inner tubular rubber layer, and predict the remaining lifetime of the hose in use based on the threshold and the thermal degradation point identified by the thermal degradation point identification unit.

A hose remaining lifetime prediction system according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction system includes:

a thermal degradation model generation unit configured to obtain, for a hose of a same type as the hose in use, relationship at each temperature between use time of the inner tubular rubber layer and a physical property value of rubber forming the inner tubular rubber layer, and generate a thermal degradation model for the inner tubular rubber layer;

a sensor unit configured to measure temperature during use of the inner tubular rubber layer until a time of the prediction, and a measurement and recording unit configured to record, together with the temperature, use time at the temperature;

a thermal degradation point identification unit configured to identify, in the thermal degradation model, a thermal degradation point of the inner tubular rubber layer at the time of the prediction, based on the thermal degradation model generated by the thermal degradation model generation unit and the temperature and the use time recorded in the measurement and recording unit; and a remaining lifetime prediction unit configured to set a threshold for the physical property value of the rubber forming the inner tubular rubber layer as a limit of use of the inner tubular rubber layer, and predict the remaining lifetime of the hose in use based on the threshold and the thermal degradation point identified by the thermal degradation point identification unit.

A hose remaining lifetime prediction system according to the disclosure, for predicting a remaining lifetime of a hose in use, the hose including at least an inner tubular rubber layer, a reinforcing layer disposed on an outer peripheral side of the inner tubular rubber layer, and a sheath layer disposed on an outer peripheral side of the reinforcing layer, the hose remaining lifetime prediction system includes:

a lifetime reaching use time calculation unit configured to calculate, for a hose of a same type as the hose in use, use time required to reach a predetermined lifetime at each temperature;

a measurement unit configured to measure, for the hose in use, actual use time at each temperature;

a thermal load calculation unit configured to calculate a thermal load at each temperature, based on the actual use time at each temperature measured by the measurement unit and the use time required to reach the predetermined lifetime at each temperature; and a remaining lifetime prediction unit configured to set a time when a total thermal load, being a summation of the thermal loads at every temperature, reaches a predetermined limit, as a lifetime of the hose in use, and predict the remaining lifetime based on relationship with the total thermal load at a present time.

BRIEF DESCRIPTION OF THE DRAWINGS

In the accompanying drawings:

FIG. 3 is a flowchart of the hose remaining lifetime prediction method according to the first embodiment of the disclosure;

DETAILED DESCRIPTION

Embodiments of the disclosure will be described below by way of example with reference to the drawings.

Figure 1:
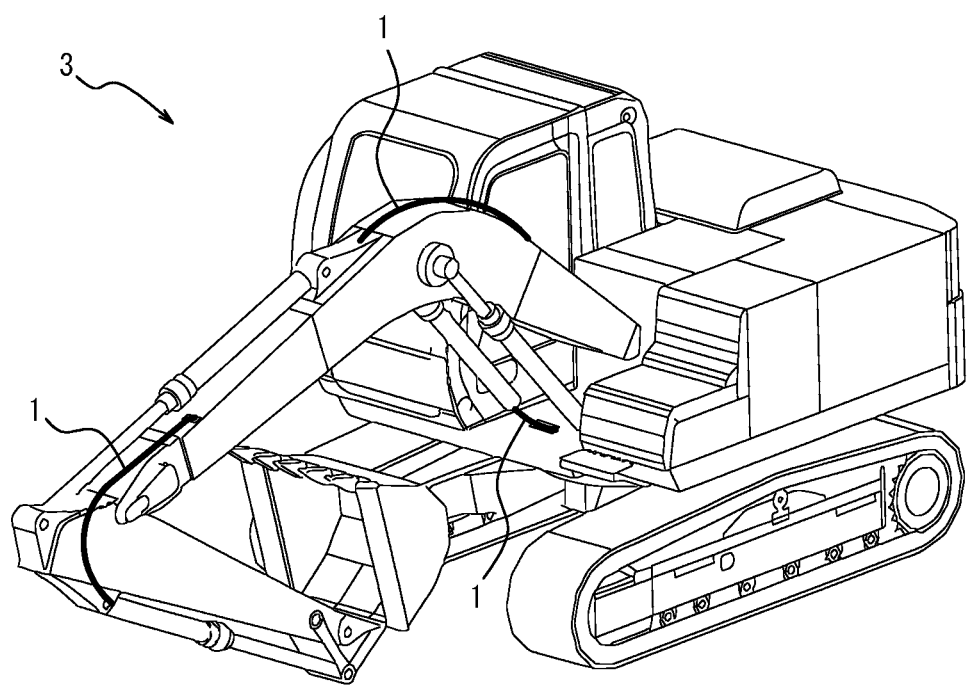
FIG. 1 is a general perspective view of an example of a hose whose lifetime is to be predicted by a hose remaining lifetime prediction method according to a first embodiment of the disclosure and a hose remaining lifetime prediction system according to the first embodiment of the disclosure, in a state of being attached to machinery.

First, with reference to FIG. 1, a hose to which a hose remaining lifetime prediction method according to a first embodiment of the disclosure and a hose remaining lifetime prediction system according to the first embodiment of the disclosure may be applied will be described. As illustrated in FIG. 1, a hose 1 whose remaining lifetime is to be predicted by the hose remaining lifetime prediction method and the hose remaining lifetime prediction system of the disclosure is attached to, for example, machinery 3 (for example, construction machinery as illustrated in FIG. 1, factory equipment, or the like), and is used to transmit pressure using, for example, a high-temperature and high-pressure fluid (such as oil). To both ends of the hose 1 illustrated in FIG. 1, joints 2 (not illustrated) for connecting to the machinery 3 may be attached by being inserted into the hose 1 and being swaged. The hose 1 may be attached to the machinery 3 via the joints 2.

Figure 2A:
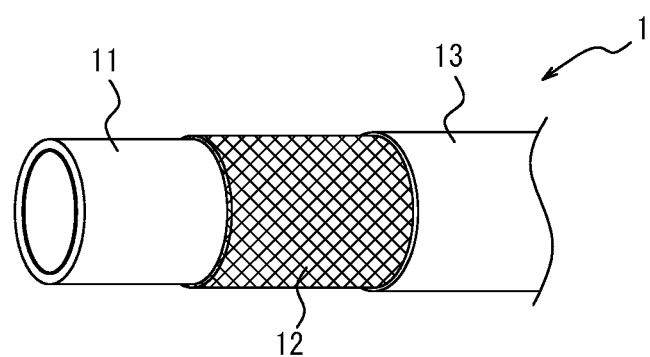
FIG. 2A is a partly exploded perspective view illustrating by way of example an internal configuration of the hose illustrated in FIG. 1.

In this example, as illustrated in FIG. 2, the hose 1 has at least an inner tubular rubber layer 11, a reinforcing layer 12 disposed on an outer peripheral side of the inner tubular rubber layer 11, and a sheath layer 13 disposed on an outer peripheral side of the reinforcing layer 12.

The inner tubular rubber layer 11 is an innermost rubber layer and is resistant to heat and others to the fluid flowing therein. The reinforcing layer 12 is provided in one or more layers (one layer in the example of FIG. 2A and four layers in the example of FIG. 2B) and has a role of ensuring pressure resistance of the hose 1.

The reinforcing layer 12 is formed by a reinforcing material such as fibers or metal wires, in a spiral form, a woven form, or the like (woven form in the example of FIG. 2A, spiral form in the example of FIG. 2B), wound around the outer periphery of the inner tubular rubber layer 11 or an outer peripheral side thereof.

The sheath layer 13 forms an outermost layer of the hose 1, and is formed of a material that is resistant to abrasion, weather, and the like and that can protect the hose 1 from external environment. The material of the sheath layer 13 is not particularly limited, but for example, the sheath layer 13 can be formed of rubber.

Figure 2B:
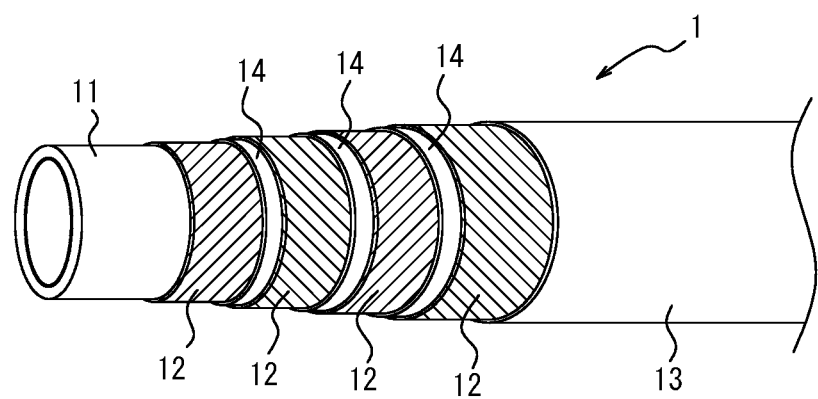
FIG. 2B is a partly exploded perspective view illustrating by way of example an internal configuration of the hose illustrated in FIG. 1.

As illustrated in FIG. 2B, one or more intermediate rubber layers 14 (three layers in the example of FIG. 2B) may be disposed between the inner tubular rubber layer 11 and the sheath layer 13. In a case in which the reinforcing layers 12 are plural, as in the example of FIG. 2B, the intermediate rubber layer 14 is located between the reinforcing layers 12 to prevent each of the reinforcing layers 12 from shifting each other and to prevent each of the reinforcing layers 12 from contacting each other and being worn. The intermediate rubber layer 14 need not be provided. In addition, an under woven layer (not illustrated) may be inserted between the reinforcing layer 12 and the inner tubular rubber layer 11 to prevent the reinforcing layer 12 from biting into the inner tubular rubber layer 11.

However, although not illustrated in the drawings, the hose 1 may be covered on an outer periphery of the sheath layer 13 with a protective cover (exterior protective component) made of resin, metal, or the like to enhance protection of the hose 1 from heat, flaw, and the like. In this case, the protective cover need not be bonded to the sheath layer 13.

A background for obtaining the hose remaining lifetime prediction method of the disclosure and the hose remaining lifetime prediction system of the disclosure will be first described.

In the above-described hose 1 illustrated in FIG. 1, the inner tubular rubber layer 11 is gradually degraded, even when the hose 1 is used within a range specified in specifications of the hose 1. The inventors have diligently investigated causes of the degradation of the inner tubular rubber layer 11, and have found that the hose 1 is repeatedly subjected to physical input such as bending, swinging, and pressure, and that the magnitude of the physical input varies depending on a position to which the hose 1 is attached, but that the degradation of the inner tubular rubber layer 11 is not greatly accelerated by the physical input within the range specified in the specifications. The inventors have come to the conclusion that the inner tubular rubber layer 11 is mainly degraded by heat. Therefore, the inventors have thought that it would be possible to predict a remaining lifetime of the hose 1 by using heat received by the inner tubular rubber layer 11 of the hose 1 in use. The disclosure is based on this idea.

<Hose Remaining Lifetime Prediction Method According to First Embodiment>

First, the hose remaining lifetime prediction method according to the first embodiment of the disclosure will be described with reference to FIGS. 3-6. The hose remaining lifetime prediction method according to the first embodiment of the disclosure is to predict a remaining lifetime of the hose 1 in use, which has at least the inner tubular rubber layer 11, the reinforcing layer 12 disposed on the outer peripheral side of the inner tubular rubber layer 11, and the sheath layer 13 disposed on the outer peripheral side of the reinforcing layer 12. Here, the hose in use can be arbitrarily defined according to an operating form of the machinery, but in the present embodiment, the hose in use refers to a hose in a state where the machinery to which the hose is attached is in operation and after operation until heat is reduced.

As illustrated in FIG. 3, in the hose remaining lifetime prediction method according to the first embodiment of the disclosure, for predicting a remaining lifetime of the hose 1 in use, includes: obtaining in advance, for a hose of the same type as the hose 1 in use, the relationship between use time of an inner tubular rubber layer at a reference temperature and a physical property value of rubber forming the inner tubular rubber layer and generating a thermal degradation model of the inner tubular rubber layer (thermal degradation model generation step); calculating, for the hose in use, reference temperature use time, which is use time of the inner tubular rubber layer 11 at the reference temperature until a time of the prediction (reference temperature use time calculation step); and predicting the remaining lifetime of the hose in use, based on comparison between the reference temperature use time calculated in the reference temperature use time calculation step and the thermal degradation model generated in the thermal degradation model generation step (remaining lifetime prediction step).

[Thermal Degradation Model Generation Step]

In the thermal degradation model generation step, for the hose of the same type as the hose 1 in use, the relationship between the use time of the inner tubular rubber layer at the reference temperature and the physical property value of the rubber forming the inner tubular rubber layer is obtained in advance, and the thermal degradation model for the inner tubular rubber layer is generated. Here, the hose of the same type as the hose in use (hereinafter simply referred to as "same type of hose") refers to a hose whose inner tubular rubber layer is made of rubber of the same type as that of the inner tubular rubber layer of the hose in use. The rubber of the same type means that the composition of the rubber is the same.

The physical property value of the rubber forming the inner tubular rubber layer used in the thermal degradation model of the inner tubular rubber layer is not particularly limited, and is preferably, for example, elongation at break, strength at break, or hardness. This is because the elongation at break, the strength at break, or the hardness is commonly used as an index for a physical property value of rubber and can be accurately measured. However, the physical property value of the rubber used in the thermal degradation model is not limited to the index, and a plurality of indexes may also be used. In the present embodiment, the elongation at break is used as an example.

Figure 4:
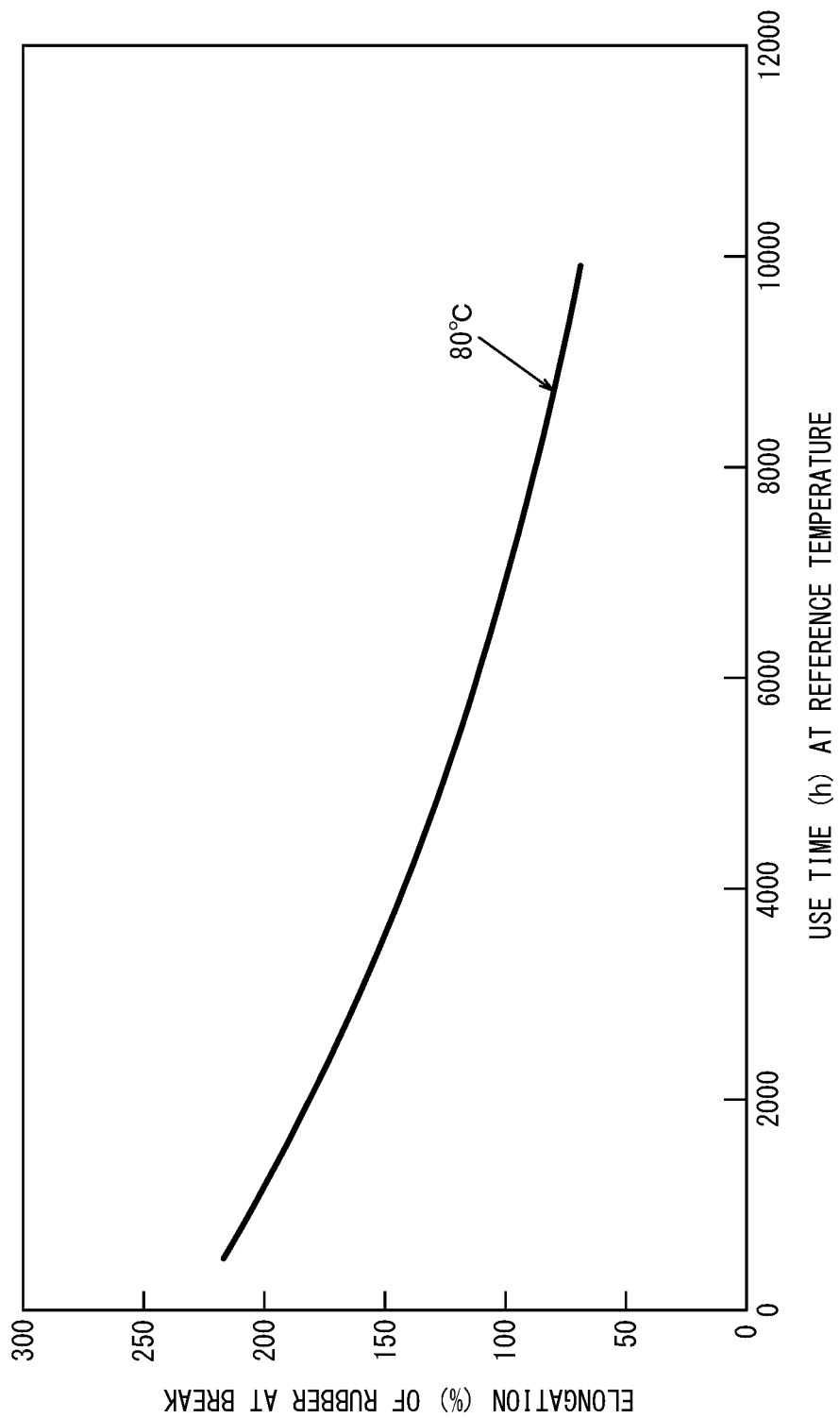
FIG. 4 is a conceptual diagram illustrating an example of a thermal degradation model according to embodiments.

FIG. 4 illustrates an example of the thermal degradation model in the present embodiment. FIG. 4 illustrates the relationship between use time (h) of the same type of hose at the reference temperature and elongation (%) at break of the rubber forming the inner tubular rubber layer. In this example, the thermal degradation model is a graph that indicates the relationship between the use time at the reference temperature and the physical property value of the rubber (in this example, the elongation at break of the rubber), as illustrated in FIG. 4. Here, the reference temperature is a temperature of reference that is determined for convenience in predicting the remaining lifetime of the hose, and can be determined arbitrarily. Although the reference temperature can be arbitrarily determined, the reference temperature is preferably about the same as actual heat received by the inner tubular rubber layer 11 of the hose 1 in use. In the illustrated example, the reference temperature is set to 80° C.

For example, the thermal degradation model may be a graph that indicates the transition of the value of the elongation of the rubber at break, based on results obtained by conducting a test in which the elongation of the rubber forming the inner tubular rubber layer at break is measured at multiple points in use time by continuously circulating a fluid at 80° C. in the same type of hoses. For example, the elongation of the rubber at break can be measured by a tensile test based on JISK6251. In addition, in a case in which the strength of the rubber at break is used as the physical property value of the rubber, measurement can be performed based on, for example, JISK6251, and in a case in which the hardness of the rubber is used, measurement can be performed based on, for example, JISK6253.

The elongation of the rubber at break may be measured continuously, but may also be measured at time intervals. It is also necessary to take values at multiple temperatures, for example, by conducting tests to measure the elongation of the rubber forming the inner tubular rubber layer at break at multiple points in use time by continuously circulating the fluid of higher or lower temperatures than the reference temperature in the same type of hoses, in order to be enable conversion into the reference temperature. This facilitates conversion into the reference temperature when acquiring data during use.

In a case in which multiple indexes among the elongation at break, the strength at break, and the hardness are used as the physical property values of the rubber, a thermal degradation model is generated for each physical property value.

[Reference Temperature Use Time Calculation Step]

In the reference temperature use time calculation step, the reference temperature use time, which is the use time of the inner tubular rubber layer 11 at the reference temperature until the time of the prediction, is calculated for the hose 1 in use.

The reference temperature, as described above, is a reference temperature that is determined for convenience in predicting the remaining lifetime of the hose and can be determined arbitrarily.

For example, in the reference temperature use time calculation step, for the hose 1 in use, data on use temperature of the inner tubular rubber layer 11 is acquired in each time until the time of the prediction (data acquisition step), and an accumulation of use time at the use temperature in each time, in the data acquired in the data acquisition step, is converted into the reference temperature use time (reference temperature conversion step).

In the data acquisition step, the data on the use temperature of the inner tubular rubber layer 11 of the hose 1 in use is acquired in each time until the time of predicting the remaining lifetime of the hose 1 in use. The use temperature in each time may be measured continuously, but may also be measured at time intervals. From the viewpoint of facilitating the conversion to the reference temperature, it is preferable to measure periodically at predetermined time intervals.

The use temperature of the inner tubular rubber layer 11 of the hose 1 in use may be temperature on an inner peripheral side of the inner tubular rubber layer 11 or, for example, fluid temperature of the fluid, which is used to transmit pressure on the inner peripheral side of the inner tubular rubber layer 11, in a tank. Since the temperature in the tank is relatively constant in many cases, the temperature of the tank is preferably measured. In a case in which there is a temperature difference between the tank of the fluid and the inner tubular rubber layer 11, a value obtained by adding or subtracting the temperature difference may be set as the temperature of the inner tubular rubber layer 11. Alternatively, the temperature of the inner tubular rubber layer 11 may be measured by installing a temperature sensor in advance on the inner peripheral side of the inner tubular rubber layer 11.

The use temperature in each time may be, for example, if use temperature at one measurement is 90° C., use temperature at the next measurement one hour later is 60° C., and the hose continues to be used until one hour after that, then 90° C. is given continuously for one hour and then 60° C. is given continuously for one hour.

Figure 5:
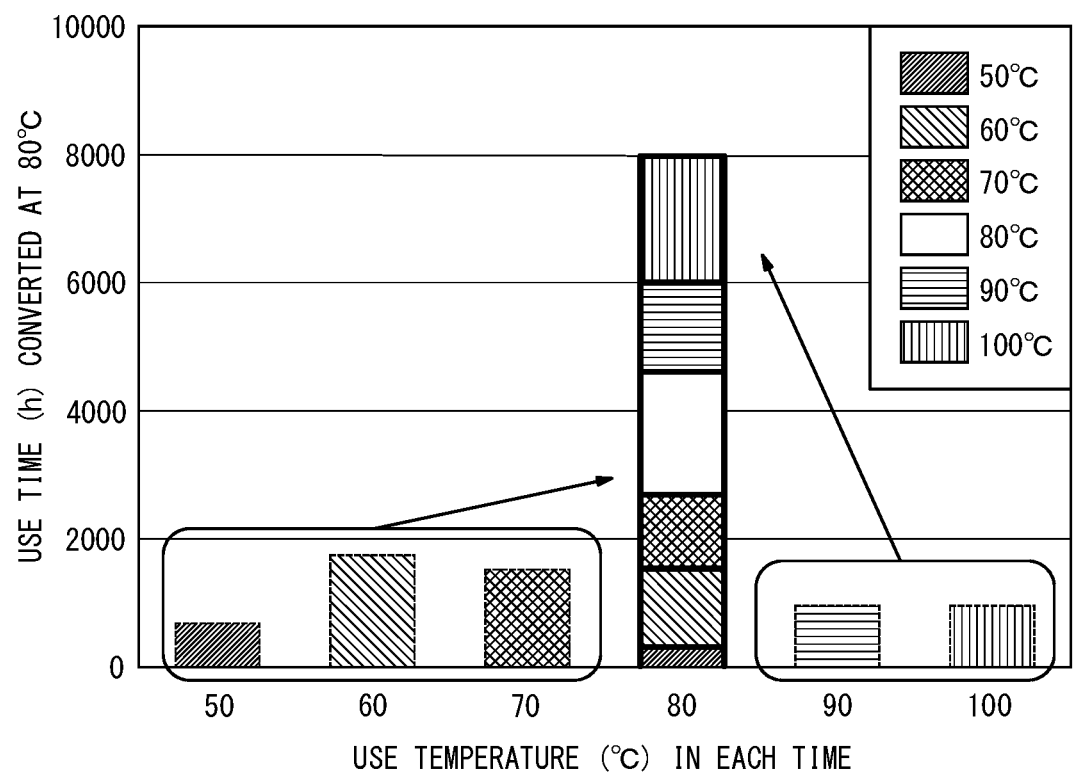
FIG. 5 is a conceptual diagram illustrating an example of a step for converting an accumulation of use temperature in each time into use time at a reference temperature.

In the reference temperature conversion step, the accumulation of the use temperature in each time, in the data acquired in the above-mentioned data acquisition step, is converted into the reference temperature use time. FIG. 5 is an image diagram illustrating an example of the step for converting the accumulation of the use temperature in each time into the reference temperature (80° C. in the illustrated example) use time.

A method for converting the accumulation of the use temperature in each time into the reference temperature use time is not particularly limited, but for example, the following method can be used. First, a provisional limit is set for the physical property value of the rubber of the inner tubular rubber layer 11 of the hose 1, as a limit of use of the hose 1. Next, multiple hoses of the same type are prepared, and tests are conducted in which the fluid of different temperatures is continuously circulated through the individual hoses, and time required to reach the limit is measured. Based on the results of these tests on the multiple hoses of the same type, time required to reach the limit at arbitrary temperature is calculated from the relationship between use time (h) and the reciprocal (1/T) of temperature. For example, by generating a graph that indicates the relationship between the logarithm of use time and the reciprocal of temperature, time required to reach the limit at arbitrary temperature can be calculated. The provisional limit of the physical property value of the rubber is basically the same as a threshold described later in the remaining lifetime prediction step.

By including the data acquisition step and the reference temperature conversion step in the reference temperature use time calculation step, the remaining lifetime of the hose can be measured more easily.

[Remaining Lifetime Prediction Step]

In the remaining lifetime prediction step, the remaining life of the hose 1 in use is predicted based on comparison between the reference temperature use time calculated in the reference temperature use time calculation step and the thermal degradation model generated in the thermal degradation model generation step.

Figure 6:
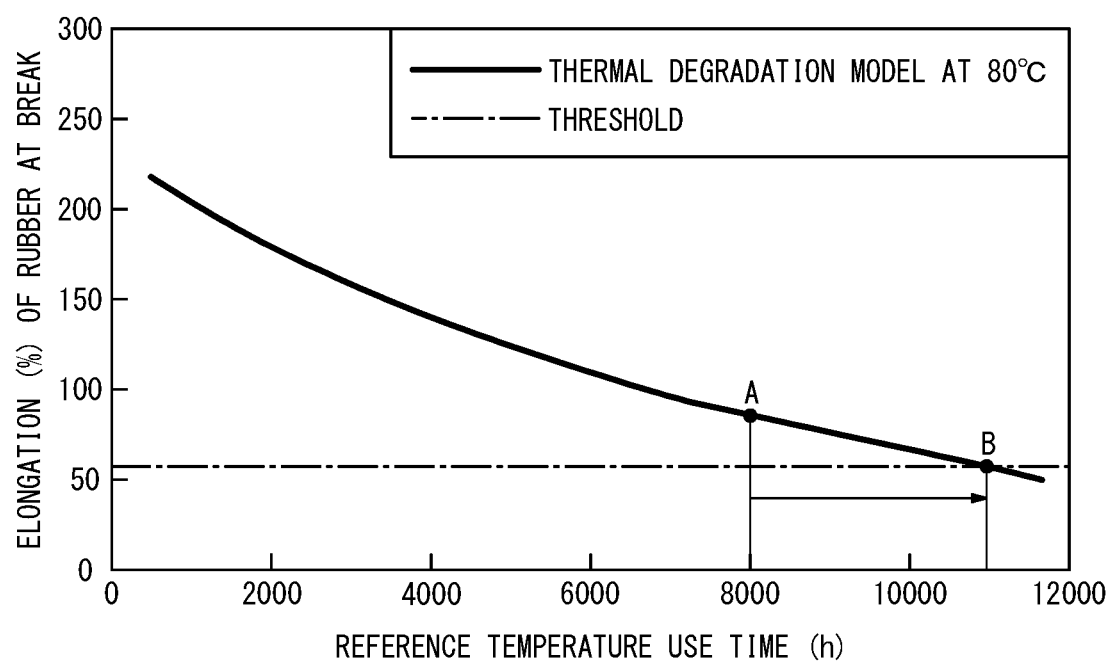
FIG. 6 is a conceptual diagram illustrating an example of the relationship between elongation of rubber at break and reference temperature use time.

More specifically, for example, as illustrated in FIG. 6, a threshold of the physical property value of the rubber forming the inner tubular rubber layer 11 is set as a limit of use of the inner tubular rubber layer 11, and the remaining lifetime is predicted to be, in the thermal degradation model, time from a time when the reference temperature use time has elapsed to a time when use time at which the physical property value reaches the threshold has elapsed. According to the above method, the remaining lifetime of the hose can be predicted more easily and accurately.

A method for setting the threshold of the physical property value of the rubber is not particularly limited, but for example, the physical property value of a broken hose of the same type as the hose in use is measured and the threshold may be set based on the value.

As the limit of use of the inner tubular rubber layer 11, the threshold of the physical property value of the rubber forming the inner tubular rubber layer 11 may be determined according to the magnitude of physical input to the hose 1 in use. Since the magnitude of the physical input to the hose 1 in use varies depending on condition and environment in which the hose 1 in use is mounted, it is preferable to take into account the magnitude of such physical input. For example, a hose used in environment with small physical input, such as a fixed pipe, and a hose used in environment with large physical input, such as a movable pipe, generally have different physical property values in failure products. In the case of the movable pipe, a failure of the hose is also affected by the physical input, so it is appropriate to set a higher threshold for thermal degradation. In the case of using the elongation of the rubber at break as the physical property value, the smaller the elongation of the rubber of the hose at break, the worse the property of the rubber is.

The threshold of the physical property value of the rubber can be set as appropriate according to the use position or the like of the hose, but it is preferable to set the threshold at a value before the inner tubular rubber layer 11 reaches an actual limit of use, so that the hose can be replaced at a stage before a failure such as leakage of a liquid from a swaged portion of the hose or break of the hose occurs.

In the remaining lifetime prediction step, for example, as illustrated in FIG. 6, the elongation of the rubber forming the inner tubular rubber layer 11 of the hose 1 at break at a reference temperature use time elapsed point (A) can be estimated by plotting the reference temperature use time on the thermal degradation model at the reference temperature (80° C. in the example illustrated in the drawing). The remaining life of the hose 1 can then be predicted as time from the reference temperature use time elapsed point (A) to a use time elapsed point (B) at which the physical property value reaches the threshold. In order to predict the remaining life, it is not necessary to estimate the value of the elongation of the rubber at break at a time of the reference temperature use time elapsed point (A), but it is sufficient to know time between the reference temperature use time elapsed point (A) and the use time elapsed point (B).

In setting the thermal degradation model and the threshold, an index with the fastest degradation in the physical property value is preferably used among the multiple indexes.

According to the hose remaining lifetime prediction method of the present embodiment, it is possible to easily predict the remaining lifetime of the hose, without requiring monitoring of both pressure and temperature of the hose in use nor without destroying the hose.

<Hose Remaining Lifetime Prediction Method According to Second Embodiment>

First, a hose remaining lifetime prediction method according to a second embodiment of the disclosure will be described with reference to FIGS. 7 and 8. The hose remaining lifetime prediction method according to the second embodiment of the disclosure, as with the first hose remaining lifetime prediction method, is a method for predicting a remaining lifetime of a hose 1 in use, having at least an inner tubular rubber layer 11, a reinforcing layer 12 disposed on an outer peripheral side of the inner tubular rubber layer 11, and a sheath layer 13 disposed on an outer peripheral side of the reinforcing layer 12.

A second hose remaining lifetime prediction method will be described below, focusing on the differences from the first hose remaining lifetime prediction method.

Figure 7:
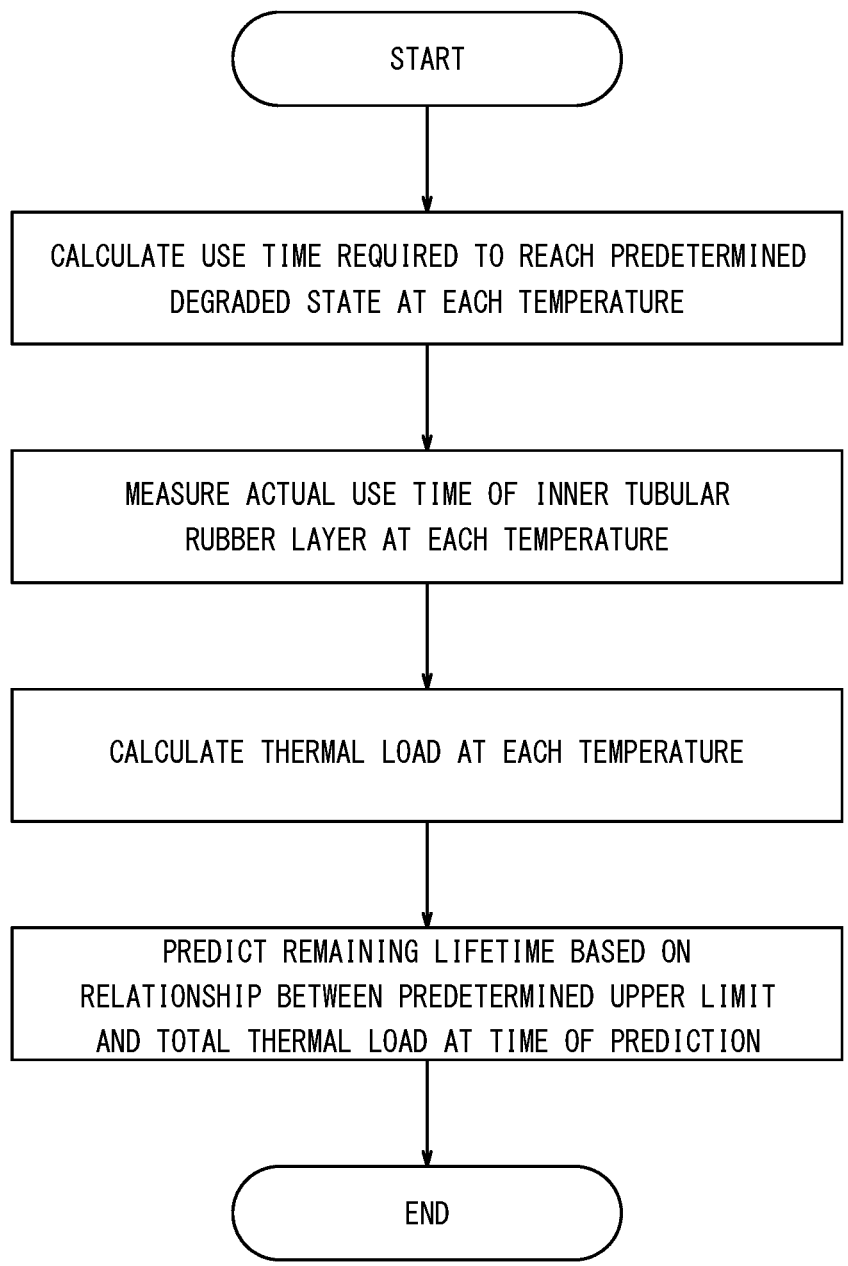
FIG. 7 is a flowchart of a hose remaining lifetime prediction method according to a second embodiment of the disclosure.

As illustrated in FIG. 7, the hose remaining lifetime prediction method according to the second embodiment of the disclosure includes: calculating, for a hose of the same type as the hose 1 in use, use time required for an inner tubular rubber layer to reach a predetermined degraded state at each temperature (degraded state reaching use time calculation step); measuring, for the hose 1 in use, actual use time of the inner tubular rubber layer 11 at each temperature (measurement step); calculating a thermal load at each temperature, based on the actual use time at each temperature measured in the measurement step and the use time required to reach the predetermined degraded state at each temperature (thermal load calculation step); and setting a time when a total thermal load, being a summation of the thermal loads at every temperature, reaches a predetermined upper limit as a lifetime of the hose in use, and predicting the remaining lifetime of the hose 1 in use based on the relationship between the predetermined upper limit and the total thermal load at a time of the prediction (remaining lifetime prediction step).

[Degraded State Reaching Use Time Calculation Step]

In the degraded state reaching use time calculation step, for the hose of the same type as the hose 1 in use, the use time required for the inner tubular rubber layer to reach the predetermined degraded state is obtained at each temperature.

The inner tubular rubber layer reaching the predetermined degraded state means, for example, that a physical property value of rubber forming the inner tubular rubber layer reaches a set value. The physical property value of the rubber forming the inner tubular rubber layer is not particularly limited, and is preferably, for example, elongation at break, strength at break, or hardness. This is because the elongation at break, the strength at break, or the hardness is commonly used as an index for a physical property value of rubber and can be accurately measured. However, an index for determining that the inner tubular rubber layer has reached the predetermined degraded state is not limited to the index, and multiple indexes may also be used. In the present embodiment, the elongation at break is used as an example.

The use time at each temperature refers to time required for the inner tubular rubber layer of the same type of hose to reach the predetermined degraded state described above at a certain temperature.

A method for determining the use time required for the inner tubular rubber layer of the same type of hose to reach the predetermined degraded state at each temperature is not particularly limited, but may be, for example, in the following manner. FIG. 8 illustrates a conceptual diagram of an example of a method for determining, for the same type of hose, the use time required for the inner tubular rubber layer to reach the predetermined degraded state at each temperature.

First, the physical property value of the rubber at which the inner tubular rubber layer of the hose 1 reaches the predetermined degraded state is set. Next, multiple hoses of the same type are prepared, and a test is conducted in which a fluid of different temperatures is continuously circulated through each of the hoses, and use time is measured until the physical property value of the rubber forming the inner tubular rubber layers of the hoses reaches the value set above. Based on the results of the test on the multiple hoses of the same type, a graph illustrating the relationship between the logarithm (L) of the use time required to reach the predetermined degraded state at each temperature and the reciprocal (1/T) of the temperature is generated to determine use time required for the inner tubular rubber layer to reach the predetermined degraded state at a certain specific temperature.

In generating the above graph, the number of hoses of the same type is not particularly limited, but from the viewpoint of more accurately predicting the remaining life of the hose, at least four hoses are preferably used. The temperatures of the fluid circulating in the hoses of the same type are also not particularly limited, but from the viewpoint of more accurately predicting the remaining life of the hoses, it is preferable to include a fluid of a temperature equivalent to heat actually received by the inner rubber tube layer 11 of the hose 1 in use.

[Measurement Step]

In the measurement step, for the hose 1 in use, the actual use time of the inner rubber tube layer 11 at each temperature is measured. The measurement of the actual use time at each temperature refers to measuring the temperature of the inner tubular rubber layer 11 during use of the hose 1 in use, and measuring the actual use time at each temperature. For example, the actual use time of the inner tubular rubber layer 11 of the hose 1 in use at each temperature is measured until a time when the remaining life of the hose 1 in use is predicted.

Here, the temperature of the inner tubular rubber layer 11 of the hose 1 in use may be temperature on an inner peripheral side of the inner tubular rubber layer 11 or, for example, fluid temperature of a fluid, which is used to transmit pressure on the inner peripheral side of the inner tubular rubber layer 11, in a tank. Since the temperature in the tank is relatively constant in many cases, the temperature of the tank is preferably measured. In a case in which there is a temperature difference between the tank of the fluid and the inner tubular rubber layer 11, a value obtained by adding or subtracting the temperature difference may be set as the temperature of the inner tubular rubber layer 11. Alternatively, the temperature of the inner tubular rubber layer 11 may be measured by installing a temperature sensor in advance on the inner peripheral side of the inner tubular rubber layer 11.

In measuring the actual use time at each temperature, the temperature of the hose 1 in use may be measured continuously, but may also be measured at time intervals. From the viewpoint of facilitating calculation of the total thermal load, which will be described below, the actual use time is periodically measured at predetermined time intervals. For example, if temperature at one measurement is 90° C., temperature at the next measurement one hour later is 60° C., and the hose continues to be used until one hour after that, then 90° C. is given continuously for one hour and then 60° C. is given continuously for one hour.

[Thermal Load Calculation Step]

In the thermal load calculation step, the thermal load at each temperature is calculated based on the actual use time at each temperature measured in the above measurement step and the use time required to reach the predetermined degraded state at each temperature.

Specifically, for example, the thermal load at each temperature can be calculated based on the actual use time at each temperature measured in the above measurement step, using the graph generated in the above degraded state reaching use time calculation step. To calculate the thermal load at each temperature, for example, the following equation can be used.

$$\text{the actual use time at each temperature/the use time required to reach the predetermined degraded state at each temperature.} \quad \text{(equation)}$$

For example, as in the example of the above measurement step, if the hose 1 in use is subjected to 90° C. continuously for 1 hour, the calculation is made by dividing 1 hour by the time required to reach the predetermined degraded state at 90° C. By using the above equation, the thermal load at each temperature can be calculated simply and accurately, and the remaining lifetime of the hose can be predicted more simply and accurately.

[Remaining Lifetime Prediction Step]

In the remaining lifetime prediction step, the time when the total thermal load, being the summation of the thermal loads at every temperature, reaches the predetermined upper limit is set as the lifetime of the hose in use, and the remaining lifetime is predicted based on the relationship with the total thermal load at the time of the prediction. The total thermal load is a summation value, that is, the sum total of all the values of the thermal loads at the multiple temperatures until the time of the prediction, calculated in the thermal load calculation step.

The "predetermined upper limit" of the total thermal load can be set to any value, such as, for example, a value when the total thermal load at each temperature, calculated in the above thermal load calculation step, reaches "1". For example, a value calculated by the equation for calculating the thermal load at each temperature, as illustrated in the above thermal load calculation step, is always less than 1, and if the actual use time is accumulated, the total use time required to reach the predetermined degraded state will finally become 1. At that time, it becomes the predetermined upper limit value.

The total thermal load at the time of the prediction can be calculated by accumulating the thermal load at each temperature until the time of the prediction, calculated in the above thermal load calculation step. If a time when the "predetermined upper limit" is reached is defined as the lifetime of the hose in use, the remaining lifetime can be predicted as a period until the calculated total thermal load at the time of the prediction reaches the predetermined upper limit.

A specific method for predicting the remaining lifetime of the hose based on the relationship between the total thermal load at the time of the prediction and the predetermined upper limit is not limited, but for example, assuming that the hose is to be used in the same way after the time of the prediction as it was before, the following method can be used.

First, an average thermal load from a time of installation of the hose 1 in use to a time of the prediction is calculated by dividing the total thermal load at the time of the prediction by a period from the time of installation to the time of the prediction. The unit of the period from the time of the installation to the time of the prediction can be an hourly unit, a daily unit, a monthly unit, or the like. However, from the viewpoint of properly grasping the time of replacement, it is preferable to use the average thermal load in a daily unit. Next, the remaining lifetime of the hose can be predicted by dividing a value obtained by subtracting the total thermal load at the time of the prediction from the predetermined upper limit of the total thermal load by the above average thermal load.

According to the hose remaining lifetime prediction method of the present embodiment, it is possible to easily predict the remaining lifetime of the hose because it neither requires monitoring of both pressure and temperature of the hose in use nor destroys the hose.

<Hose Remaining Lifetime Prediction Method According to Third Embodiment>

A hose remaining lifetime prediction method according to a third embodiment of the disclosure, as with the hose remaining lifetime prediction methods according to the first and second embodiments of the disclosure, is a method for predicting a remaining lifetime of a hose 1 in use, having at least an inner tubular rubber layer 11, a reinforcing layer 12 disposed on an outer peripheral side of the inner tubular rubber layer 11, and a sheath layer 13 disposed on an outer peripheral side of the reinforcing layer 12.

The hose remaining lifetime prediction method according to the third embodiment includes: obtaining in advance, for a hose of a same type as the hose in use, the relationship at each temperature between use time of the inner tubular rubber layer and a physical property value of rubber forming the inner tubular rubber layer, and generating a thermal degradation model for the inner tubular rubber layer (thermal degradation model generation step); measuring temperature during use of the inner tubular rubber layer and recording, together with the temperature, use time at the temperature, until a time of the prediction (measurement and recording step); identifying, in the thermal degradation model, a thermal degradation point of the inner tubular rubber layer at the time of the prediction, based on the thermal degradation model generated in the thermal degradation model generation step and the temperature and the use time recorded in the measurement and recording step (thermal degradation point identification step); and setting a threshold for the physical property value of the rubber forming the inner tubular rubber layer as a limit of use of the inner tubular rubber layer, and predicting the remaining lifetime of the hose 1 in use based on the threshold and the thermal degradation point identified in the thermal degradation point identification step (remaining lifetime prediction step).

In the hose remaining lifetime prediction method according to the present embodiment, the thermal degradation model generation step can use a method similar to, for example, the thermal degradation model generation step in the hose remaining lifetime prediction method according to the first embodiment.

In the measurement and recording step, temperature during use of the inner tubular rubber layer 11 of the hose 1 in use is measured, and together with the temperature, use time at the temperature is recorded. A method for measuring the temperature during use of the inner tubular rubber layer of the hose 1 in use is not particularly limited. For example, temperature on an inner peripheral side of the inner tubular rubber layer 11 of the hose 1 in use may be measured. More specifically, the temperature of the inner tubular rubber layer 11 may be measured by installing a temperature sensor in advance on the inner peripheral side of the inner tubular rubber layer 11. Suitably, the temperature during use of the inner tubular rubber layer of the hose 1 in use is measured at a position other than the hose 1 in use. The position other than the hose 1 in use may be, for example, fluid temperature of a fluid, which is used to transmit pressure on the inner peripheral side of the inner tubular rubber layer 11, in a tank. Since the temperature in the tank is relatively constant in many cases, the temperature of the tank is preferably measured. In a case in which there is a temperature difference between the tank of the fluid and the inner tubular rubber layer 11, a value obtained by adding or subtracting the temperature difference may be set as the temperature of the inner tubular rubber layer 11. According to this configuration, the remaining lifetime of the hose can be predicted more easily.

Information about the temperature and the use time recorded in the measurement and recording step is preferably communicable by wireless communication. According to this configuration, the remaining lifetime of the hose can be predicted more easily.

In the measurement and recording step, the recording of the temperature and the use time is preferably performed in a position other than the hose 1 in use. For example, the recording may be performed at the machinery 3 to which the hose 1 in use is attached, or outside the machinery 3. According to this configuration, the remaining lifetime of the hose can be predicted more easily.

In the thermal degradation point identification step, the thermal degradation point of the inner tubular rubber layer 11 of the hose 1 in use at the time of the prediction is identified in the thermal degradation model, based on the thermal degradation model generated in the thermal degradation model generation step and the temperature and the use time recorded in the measurement and recording step. Here, the thermal degradation point in the thermal degradation model may refer to, for example, in the graph illustrated in FIG. 6, a position that indicates a thermally degraded state using the physical property value of the rubber.

In the remaining lifetime prediction step, a threshold of the physical property value of the rubber forming the inner tubular rubber layer is set as a limit of use of the inner tubular rubber layer 11, and the remaining lifetime of the hose 1 in use is predicted based on the threshold and the thermal degradation point obtained in the thermal degradation point identification step.

According to the hose remaining lifetime prediction method of the present embodiment, it is possible to easily predict the remaining lifetime of the hose because it neither requires monitoring of both pressure and temperature of the hose in use nor destroys the hose.

<Hose Remaining Lifetime Prediction System According to First Embodiment>

Next, a hose remaining lifetime prediction system according to the first embodiment of the disclosure will be described by way of example.

[System Configuration]

Figure 9:
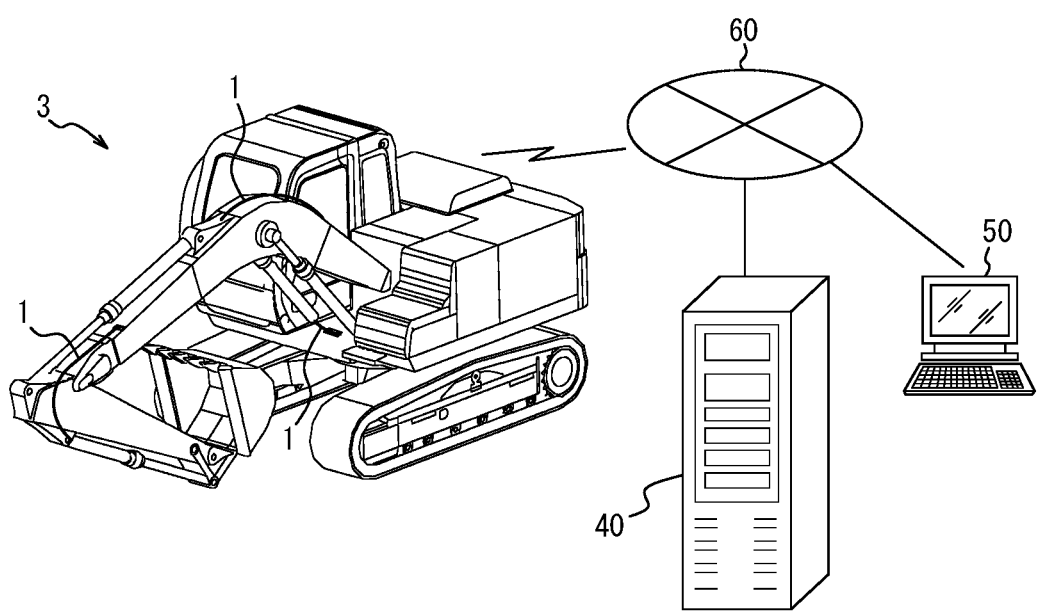
FIG. 9 is a drawing illustrating the hose remaining lifetime prediction system according to the first embodiment of the disclosure.

FIG. 9 is a configuration diagram of the hose remaining lifetime prediction system according to the first embodiment of the disclosure. In the description of a first hose remaining lifetime prediction system 100 according to the present embodiment, a "user" is a person who operates a terminal to check a remaining lifetime of the hose 1, such as a user of the machinery 3 (e.g., construction machinery, factory equipment, or the like) to which the hose 1 is attached, a seller of the machinery 3, or a seller of the hose 1. The hose remaining lifetime prediction system 100 for the hose 1 includes the machinery 3 (construction machinery in the drawing) to which the hose 1 is attached, a server 40, and one or more terminals 50, and the server 40 is communicably connected to each of the machinery 3 and the terminals 50 via a network 60. The machinery 3 transmits, to the server 40, data such as use temperature and the like in each time described later. Examples of the network 60, which connects the machinery 3 and the server 40, include a wireless line, a satellite line, and the like. The server 40 predicts a remaining lifetime of the hose 1 based on data received from the machinery 3 and data stored in a database, and transmits the predicted lifetime to the terminal 50. As an example of the terminal 50, various devices such as a PC, a PDA, a mobile phone, and the like can be used. The server 40 and the terminal 50 may be attributed to different users, or be integrated. An interface between the server 40 and the terminal 50 can be realized, for example, by communication by HTTP or HTTPS, with the server 40 launching a WEB server and the terminal 50 being equipped with a WEB browser.

[Machinery]

Figure 10:
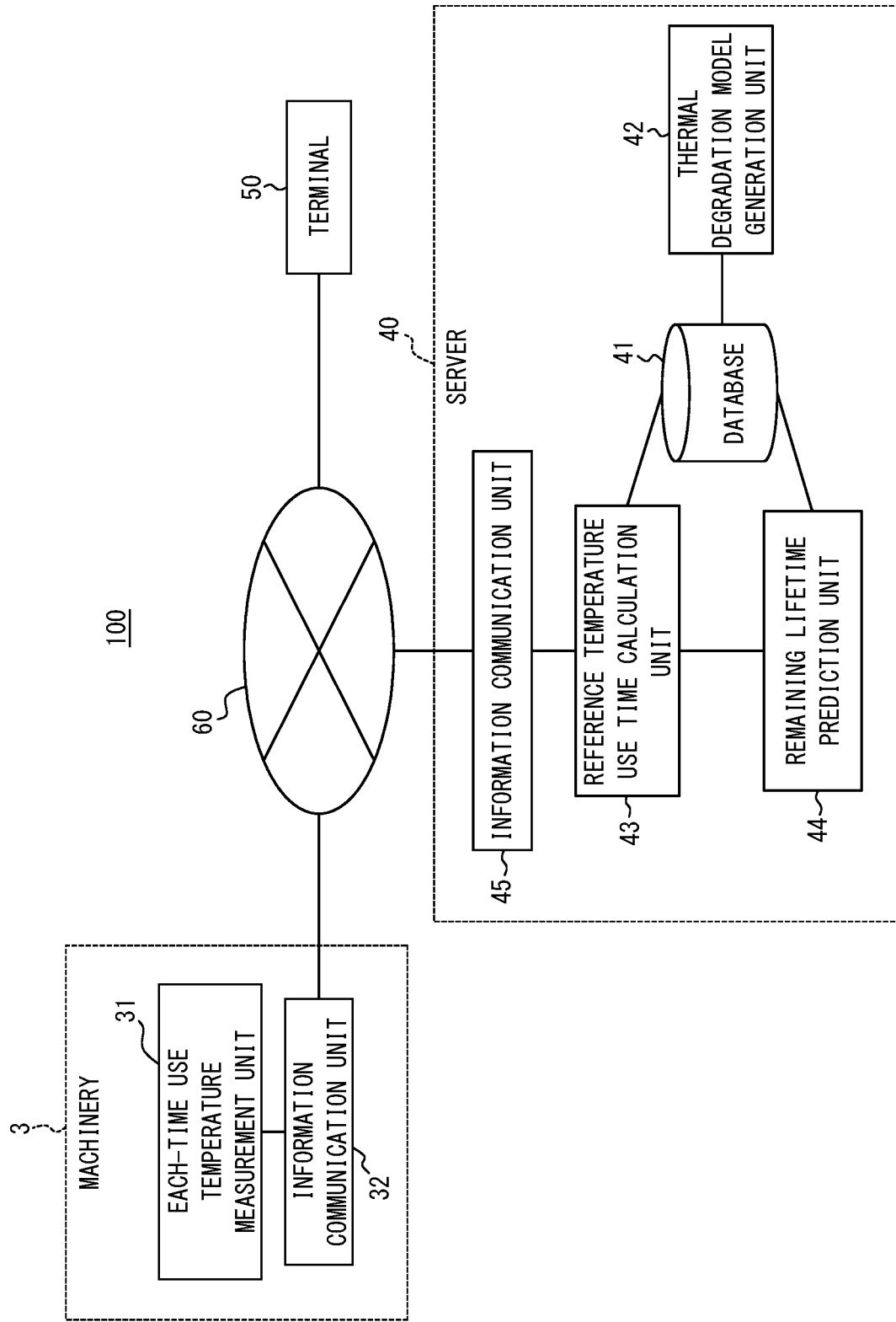
FIG. 10 is a functional block diagram illustrating a control configuration of the system according to the first embodiment of the disclosure.

The machinery 3 is configured to measure, for the hose 1 in use, the use temperature of the inner tubular rubber layer 11 in each time until a time of the prediction, and wirelessly transmit data on the use temperature in each time to the server 40. As illustrated in FIGS. 9 and 10, the machinery 3 is provided with an each-time use temperature measurement unit 31, which includes a sensor for measuring the use temperature of the inner tubular rubber layer 11 in each time, a recorder, and the like, and an information communication unit 32. These units are just examples, and the machinery 3 may be provided with any unit as an each-time use temperature measurement unit.

In the each-time use temperature measurement unit 31, the sensor can measure, as the use temperature of the inner tubular rubber layer 11 of the hose 1 in use, temperature on an inner peripheral side of the inner tubular rubber layer 11 or, for example, fluid temperature of a fluid, which is used to transmit pressure on the inner peripheral aside of the inner tubular rubber layer 11, in a tank. In a case in which there is a temperature difference between the tank of the fluid and the inner tubular rubber layer 11, a value obtained by adding or subtracting the temperature difference may be set as the temperature of the inner tubular rubber layer 11. Alternatively, the sensor may be installed on the inner peripheral side of the inner tubular rubber layer 11.

In the each-time use temperature measurement unit 31, the use temperature in each time may be measured continuously, but may also be measured at time intervals. From the viewpoint of suppressing the amount of data, the use temperature is preferably measured periodically at a predetermined time interval.

Furthermore, the measured use temperature in each time may be recorded on the recorder and transmitted wirelessly, either continuously or at time intervals, to the information communication unit 32 of the machinery 3, and the information communication unit 32 may communicate with the server 40 via the network 60.

[Server]

As illustrated in FIG. 10, the server 40 is provided with a database 41, a thermal degradation model generation unit 42, a reference temperature use time calculation unit 43, a remaining lifetime prediction unit 44, and an information communication unit 45. The database 41 stores various types of information used for predicting the remaining lifetime of the hose 1. The database 41 can receive information from the thermal degradation model generation unit 42. The reference temperature use time calculation unit 43 calculates, for the hose 1 in use, the use time at a reference temperature until the time of the prediction. The reference temperature use time calculation unit 43 preferably includes a data acquisition unit (e.g., a terminal with a receiving device) for acquiring data on the use temperature of the inner tubular rubber layer 11 of the hose 1 in use in each time until the time of the prediction, and a reference temperature conversion unit (e.g., a program in which a calculation equation is incorporated) for converting an accumulation of use time at the use temperature in each time acquired by the data acquisition unit into use time at the reference temperature. The remaining lifetime prediction unit 44 predicts the remaining lifetime of the hose 1 in use based on comparison between the use time of the inner tubular rubber layer 11 at the reference temperature calculated by the reference temperature use time calculation unit 43 and the thermal degradation model that is generated by the thermal degradation model generation unit 42 and stored in the database 41. The information communication unit 45 transmits, to the terminal 50, the predicted remaining lifetime of the hose 1 in use. The information communication unit 45 causes the server 40 to communicate with the machinery 3 and the terminal 50 via the network 60. The contents of the server 40 may be incorporated in the machinery 3. Also, the terminal 50 may also be incorporated into the machinery 3.

[Thermal Degradation Model Generation Unit]

The thermal degradation model generation unit 42 can generate information to be used for predicting the remaining lifetime of the hose 1 and transmit the information to the database 41. The thermal degradation model generation unit 42 generates a thermal degradation model of the inner tubular rubber layer by determining, for a hose of the same type as the hose 1 in use, the relationship between the use time of the inner tubular rubber layer at the reference temperature and a physical property value of rubber forming the inner tubular rubber layer.

The physical property value of the rubber forming the inner tubular rubber layer used in the thermal degradation model of the inner tubular rubber layer is not particularly limited, and is preferably, for example, elongation at break, strength at break, or hardness. This is because the elongation at break, the strength at break, or the hardness is commonly used as an index for a physical property value of rubber and can be accurately measured. However, the physical property value of the rubber used in the thermal degradation model is not limited to the index, and a plurality of indexes may also be used. In the present embodiment, the elongation at break is used as an example.

In this example, an example of the thermal degradation model can be a graph illustrating the relationship between the use time and the physical property value of the rubber (in this example, the elongation of the rubber at break) at the reference temperature, as illustrated in FIG. 4 above.

In a case in which multiple indexes among the elongation at break, the strength at break, and the hardness are used as the physical property values of the rubber, a thermal degradation model is generated for each physical property value.

[Reference Temperature Use Time Calculation Unit]

The reference temperature use time calculation unit 43 calculates, for the hose 1 in use, reference temperature use time, which is the use time of the inner tubular rubber layer 11 at the reference temperature until the time of the prediction.

The reference temperature use time calculation unit 43, as described above, can include, for example, the data acquisition unit for acquiring data on the use temperature of the inner tubular rubber layer 11 of the hose 1 in use in each time until the time of the prediction, and the reference temperature conversion unit for converting the accumulation of use time at the use temperature in each time acquired by the data acquisition step into the reference temperature use time.

The data acquisition unit preferably acquires the data transmitted from the machinery 3 via the network 60.

In the reference temperature conversion unit, a means for converting the accumulation of the use time at the use temperature in each time into the reference temperature use time is not particularly limited, but for example, the same means as in the reference temperature conversion step in the hose remaining lifetime prediction method of the first embodiment described above can be used.

By including data acquisition unit and reference temperature conversion unit in the reference temperature use time calculation unit, the remaining lifetime of the hose can be measured more easily.

[Remaining Lifetime Prediction Unit]

The remaining lifetime prediction unit 44 predicts the remaining lifetime of the hose 1 in use based on the comparison between the use time of the inner tubular rubber layer 11 at the reference temperature calculated by the reference temperature use time calculation unit 43 and the thermal degradation model that is generated by the thermal degradation model generation unit 42 and stored in the database 41.

More specifically, for example, as illustrated in FIG. 6, a threshold for the physical property value of the rubber forming the inner tubular rubber layer 11 is set as a limit of use of the inner tubular rubber layer 11, and the remaining lifetime is predicted to be time from a time when the reference temperature use time has elapsed to a time when use time at which the physical property value reaches the threshold has elapsed in the thermal degradation model. According to the above unit, the remaining lifetime of the hose can be predicted more easily and accurately.

The setting of the threshold may be preset in the remaining lifetime prediction unit 44, and may be inputted or changed manually or otherwise by the user.

Here, a method for setting the threshold of the physical property value of the rubber is not particularly limited, but for example, the physical property value of a broken hose of the same type as the hose 1 in use is measured and the threshold may be set based on the value.

The remaining lifetime prediction unit 44 may, for example, be configured so that the threshold can be set depending on input of the magnitude of physical input to the hose 1 in use. As described above, the magnitude of the physical input to the hose 1 in use may be different depending on a state and environment in which the hose 1 in use is mounted, and it is therefore preferable to take into account the magnitude of such physical input. For example, when the magnitude of the physical input is inputted to the remaining lifetime prediction unit 44, the threshold may be automatically set.

The threshold of the physical property value of the rubber can be set as appropriate according to the use position or the like of the hose, but it is preferable to set the threshold at a value before the inner tubular rubber layer 11 reaches an actual limit of use, so that the hose can be replaced at a stage before a failure such as leakage of a liquid from a swaged portion of the hose or break of the hose occurs.

In the remaining lifetime prediction unit, for example, as with the above remaining lifetime prediction step, as illustrated in FIG. 6, the reference temperature use time is plotted on the thermal degradation model at the reference temperature (80° C. in the example illustrated in the drawing), and the elongation of the rubber forming the inner tubular rubber layer 11 of the hose 1 at break at a time of a reference temperature use time elapsed point (A) is estimated.

In setting the thermal degradation model and the threshold, an index with the fastest degradation in the physical property value is preferably used among the multiple indexes.

[Terminal]

The terminal 50 receives the remaining lifetime of the hose 1, which is predicted by the remaining lifetime prediction unit 44, and may, for example, display the remaining lifetime of the hose 1 on a display screen.

According to this hose remaining lifetime prediction system of the present embodiment, it is possible to easily predict the remaining lifetime of the hose, without requiring monitoring of both pressure and temperature of the hose in use nor without destroying the hose.

<Hose Remaining Lifetime Prediction System According to Second Embodiment>

Next, a hose remaining lifetime prediction system according to the second embodiment of the disclosure will be described by way of example with reference to FIGS. 9 and 11. A second hose remaining lifetime prediction system 102 will be described below, focusing on points that are different from the first hose remaining lifetime prediction system 100.

[Machinery]

The machinery 3 is configured to measure, for the hose 1 in use, use time of the inner tubular rubber layer 11 at each temperature until a time of the prediction, and wirelessly transmit data on the use time at each temperature to the server 40. As illustrated in FIGS. 9 and 11, the machinery 3 is provided with a measurement unit 301, which includes a sensor for measuring the use time of the inner tubular rubber layer 11 at each temperature, a recorder, and the like, and an information communication unit 302. These units are just examples, and the machinery 3 may be provided with any unit as a measurement unit.

In the measurement unit 301, the sensor can measure temperature on an inner peripheral side of the inner tubular rubber layer 11, as each temperature of the inner tubular rubber layer 11 of the hose 1 in use, or, for example, fluid temperature of a fluid, which is used to transmit pressure on the inner peripheral aside of the inner tubular rubber layer 11, in a tank, as each temperature of the inner tubular rubber layer 11. In a case in which there is a temperature difference between the tank of the fluid and the inner tubular rubber layer 11, a value obtained by adding or subtracting the temperature difference may be set as each temperature of the inner tubular rubber layer 11. Alternatively, the sensor may be installed on the inner peripheral side of the inner tubular rubber layer 11.

In the measurement unit 301, the use time at each temperature may be measured continuously, but may also be measured at time intervals. From the viewpoint of suppressing the amount of data, the use time is preferably measured periodically at a predetermined time interval.

Furthermore, the measured use time at each temperature may b e recorded on the recorder and transmitted wirelessly, either continuously or at time intervals, to the information communication unit 302 of the machinery 3, and the information communication unit 302 may communicate with the server 40 via the network 60.

Figure 11:
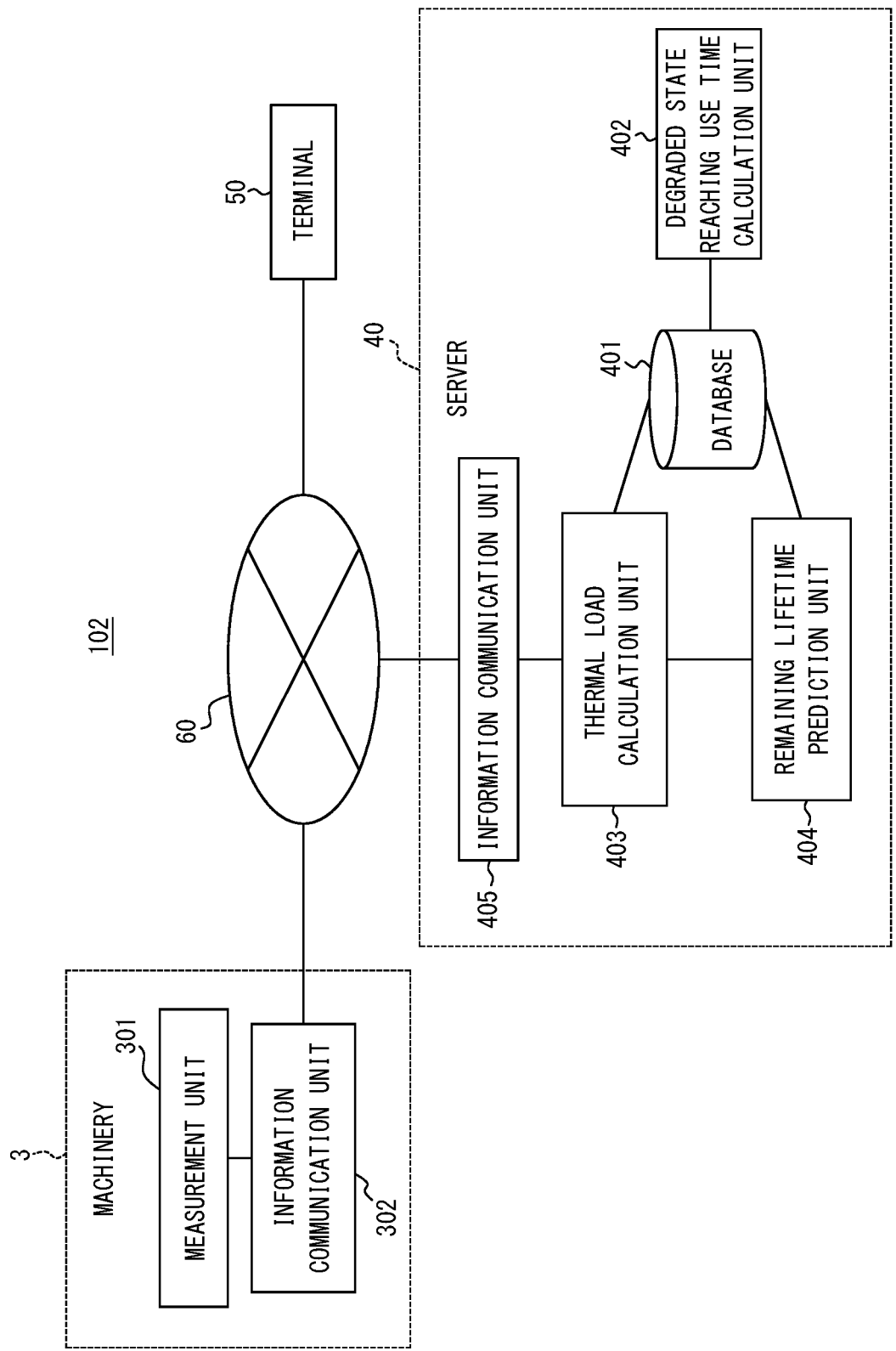
FIG. 11 is a functional block diagram illustrating a control configuration of a system according to a second embodiment of the disclosure.

As illustrated in FIG. 11, the server 40 is provided with a database 401, a degraded state reaching use time calculation unit 402, a thermal load calculation unit 403, a remaining lifetime prediction unit 404, and an information communication unit 405. The degraded state reaching use time calculation unit 402 calculates, for a hose of a same type as the hose in use, use time required for an inner tubular rubber layer to reach a predetermined degraded state at each temperature. The database 401 can receive the information from the degraded state reaching use time calculation unit 402. The thermal load calculation unit 403 calculate, for the hose 1 in use, a thermal load until the time of prediction, based on the actual use time at each temperature measured by the measurement unit 301 and the use time required to reach the predetermined degraded state at each temperature calculated by the degraded state reaching use time calculation unit 402. The remaining lifetime prediction unit 404 sets a time when a total thermal load, being a summation of the thermal loads at every temperature, reaches a predetermined upper limit, as a lifetime of the hose 1 in use, and predicts the remaining lifetime based on the relationship between the predetermined upper limit and the total thermal load at the time of the prediction. The information communication unit 405 transmits, to the terminal 50, the predicted remaining lifetime of the hose 1 in use. The information communication unit 405 causes the server 40 to communicate with the machinery 3 and the terminals 50 via the network 60. The contents of the server 40 may be incorporated into the machinery 3. Also, the terminal 50 may also be incorporated into the machinery 3.

[Degraded State Reaching Use Time Calculation Unit]

The degraded state reaching use time calculation unit 402 can generate information for use in predicting the remaining lifetime of the hose 1 and transmit the information to the database 401. The degraded state reaching use time calculation unit 402 calculates, for the hose of the same type as the hose 1 in use, the use time required for the inner tubular rubber layer to reach the predetermined degraded state at each temperature.

The definition of the predetermined degraded state and the use time at each temperature are supported by the description in the hose remaining lifetime prediction method according to the second embodiment.

Figure 8:
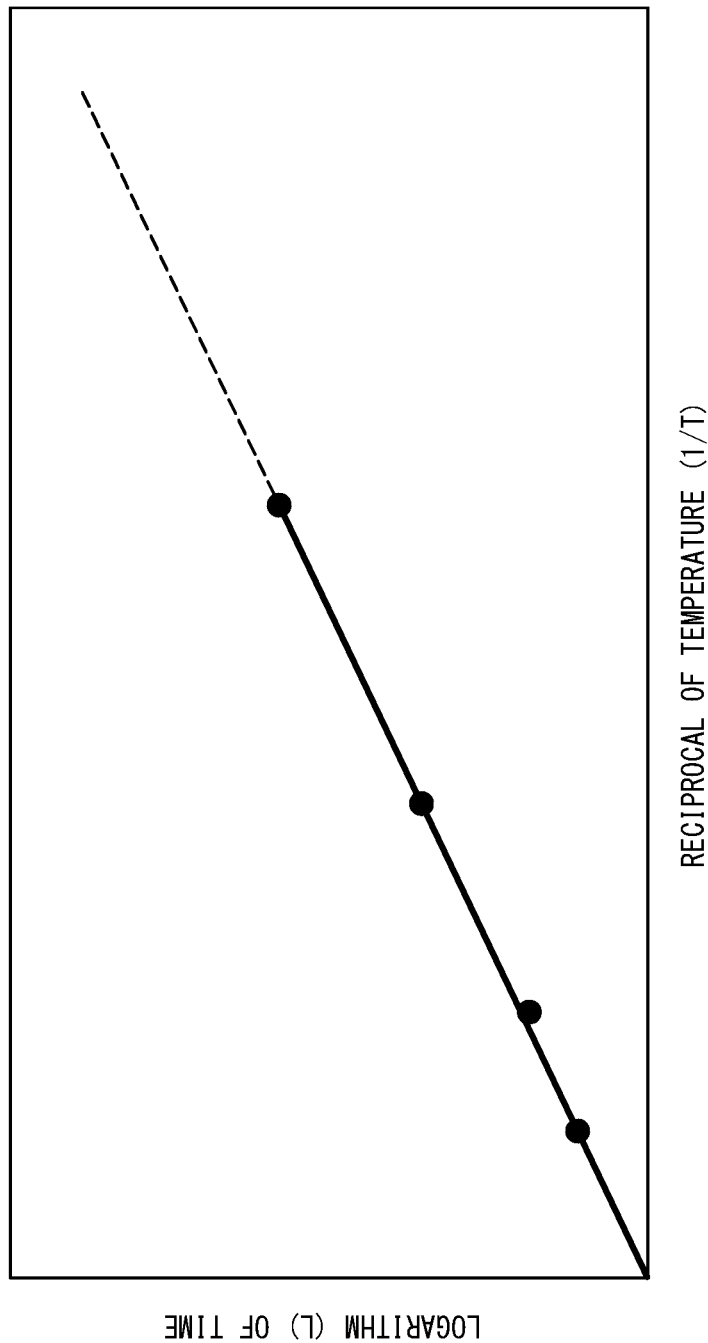
FIG. 8 is a conceptual diagram illustrating an example of a method for calculating, for a hose of the same type, use time required for an inner tubular rubber layer to reach a predetermined degraded state at each temperature.

The degraded state reaching use time calculation unit 402 of this example can calculate the use time required for the inner tubular rubber layer to reach the predetermined degraded state at each temperature by means of the graph in the conceptual diagram illustrated in FIG. 8, for example, as described in the hose remaining lifetime prediction method according to the second embodiment.

[Thermal Load Calculation Unit]

The thermal load calculation unit 403 calculates the thermal load at each temperature based on the actual use time at each temperature measured by the measurement unit 301 and the use time required to reach the predetermined degraded state at each temperature.

The thermal load calculation unit 403 can be, for example, a unit for calculating the thermal load at each temperature based on the actual use time of the hose 1 in use at each temperature measured by the above measurement unit, using the graph in the above degraded state reaching use time calculation unit 402.

The actual use time at each temperature measured by the measurement unit can be acquired, for example, from the measurement unit 301 via the information communication unit 302 and the information communication unit 405.

A means for calculating the thermal load in the thermal load calculation unit 403 is not particularly limited, but for example, the same means as in the thermal load calculation step in the above hose remaining lifetime prediction method according to the second embodiment can be used, based on the actual use time of the hose 1 in use at each temperature.

According to the thermal load calculation unit of the present embodiment, the thermal load at each temperature can be calculated easily and accurately, and hence the remaining lifetime of the hose can be predicted more easily and accurately.

[Remaining Lifetime Prediction Unit]

The remaining lifetime prediction unit 404 sets a time when the total thermal load, being the summation of the thermal loads at every temperature, which are calculated by the thermal load calculation unit 403, reaches the predetermined upper limit based on the use time required to reach the predetermined degraded state at each temperature and the actual use time at each temperature, as a lifetime of the hose 1 in use, and predicts the remaining lifetime of the hose 1 in use based on the relationship between the predetermined upper limit and the total thermal load at the time of the prediction.

The definition of the predetermined upper limit is supported by the description in the hose remaining lifetime prediction method according to the second embodiment. The predetermined upper limit may be set in advance in the remaining lifetime prediction unit 404, may be calculated by a unit for calculating the predetermined upper limit provided in the remaining lifetime prediction unit 404, or may be inputted or changed manually or otherwise by the user.

The remaining lifetime prediction unit 404 can more specifically use the same means as the remaining lifetime prediction step in the above hose remaining lifetime prediction method according to the second embodiment.

According to the hose remaining lifetime prediction system of the present embodiment, it is possible to easily predict the remaining lifetime of the hose, without requiring monitoring of both pressure and temperature of the hose in use nor without destroying the hose.

<Hose Remaining Lifetime Prediction System According to Third Embodiment>

A hose remaining lifetime prediction system according to the third embodiment of the disclosure, as with the hose remaining lifetime prediction systems according to the first and second embodiments of the disclosure, predicts a remaining lifetime of a hose 1 in use, having at least an inner tubular rubber layer 11, a reinforcing layer 12 disposed on an outer peripheral side of the inner tubular rubber layer 11, and a sheath layer 13 disposed on an outer peripheral side of the reinforcing layer 12.

The hose remaining lifetime prediction system according to the third embodiment of the disclosure will be described by way of example with reference to FIGS. 9 and 12. A third hose remaining lifetime prediction system 103 will be described below, focusing on points that are different from the first hose remaining lifetime prediction system.

Figure 12:
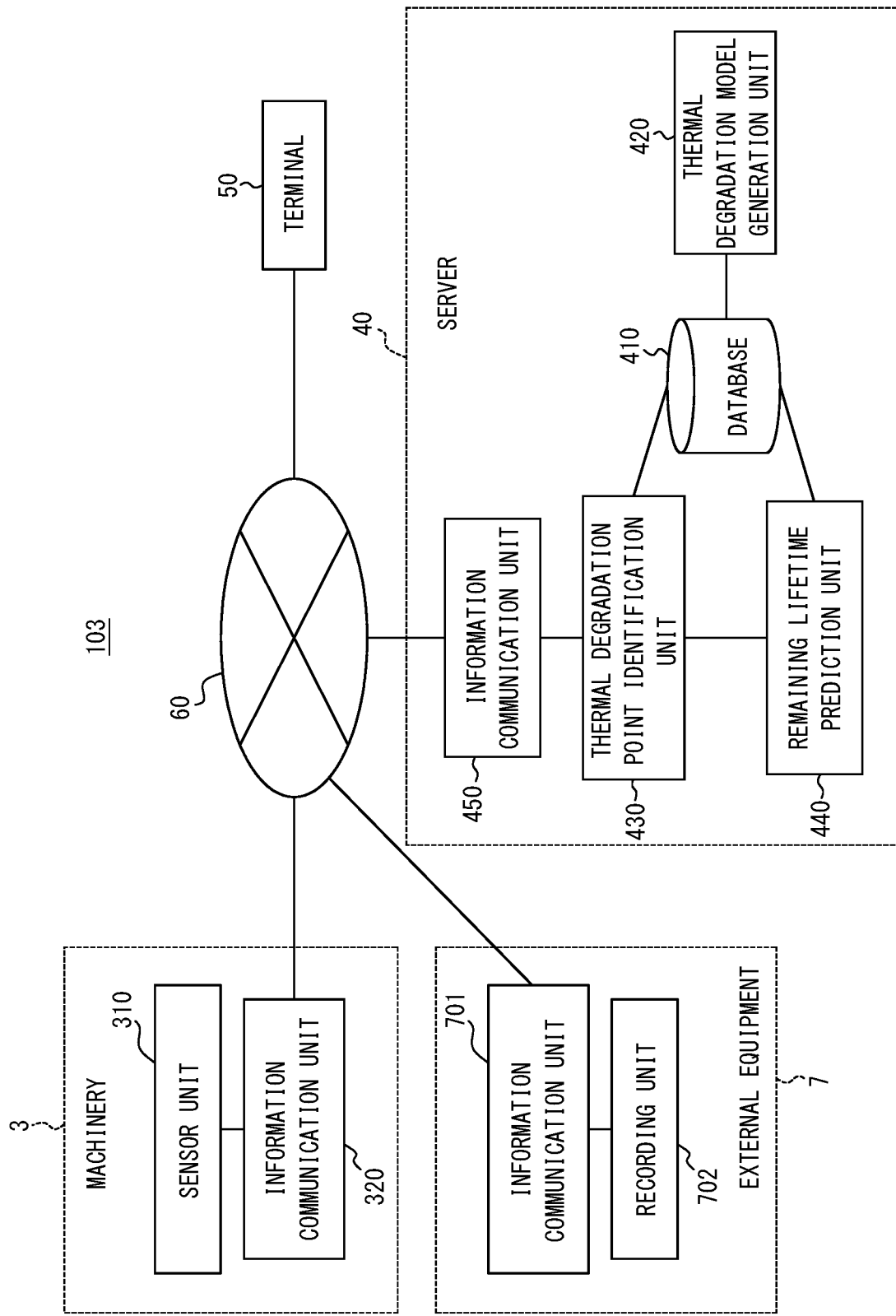
FIG. 12 is a functional block diagram illustrating a control configuration of a system according to a third embodiment of the disclosure.

As illustrated in FIGS. 9 and 12, the machinery 3 is provided with a sensor unit 310 that measures temperature during use of the inner tubular rubber layer 11 until a time of the prediction, and an information communication unit 320.

The third hose remaining lifetime prediction system 103 is also provided with a recording unit 702 that records, together with the temperature measured by the sensor unit 310, use time at the temperature. The recording unit 702 is preferably disposed in a position other than the hose 1 in use. According to this configuration, the remaining lifetime of the hose can be predicted more easily. For example, the recording unit 702 may be disposed in the machinery 3 to which the hose 1 in use is attached, or may be disposed outside the machinery 3, as illustrated in FIG. 12. In a case in which the recording unit 702 is disposed outside the machinery 3, the third hose remaining lifetime prediction system 103 may be provided with external equipment 7 including, for example, an information communication unit 701 and the recording unit 702.

The sensor unit 310 may be disposed as a temperature sensor on the inner peripheral side of the inner tubular rubber layer 11 of the hose 1 1 in use, or may be disposed in a position other than the hose 1 in use. The sensor unit 310 is preferably disposed in a position other than the hose 1 in use. The position other than the hose 1 in use may be, for example, the machinery to which the hose 1 in use is attached, or may be outside the machinery. In a case in which the measurement unit 301 is disposed in the machinery 3 to which the hose 1 in use is attached, the measurement unit 301 may be disposed, for example, in a tank of a fluid, which is used for transmitting pressure on the inner peripheral side of the inner tubular rubber layer 11. Since temperature in the tank is relatively constant in many cases, the sensor unit 310 is preferably disposed in the tank so as to measure the temperature of the tank. In a case in which there is a temperature difference between the tank of the fluid and the inner tubular rubber layer 11, a value obtained by adding or subtracting the temperature difference may be set as the temperature of the inner tubular rubber layer 11. According to this configuration, the remaining lifetime of the hose can be predicted more easily.

The temperature measured by the sensor unit 310 and the use time at the temperature are recorded on the recording unit 702. The sensor unit 310 and the recording unit 702 can communicate with the server 40 via the information communication unit 320 and the information communication unit 701, and preferably communicate by wireless communication. According to this configuration, the remaining life of the hose can be predicted more easily.

In the third hose remaining lifetime prediction system 103, a thermal degradation point identification unit 430 identifies, in the thermal degradation model, a thermal degradation point of the inner tubular rubber layer 11 at the time of the prediction, based on the thermal degradation model generated by the thermal degradation model generation unit 420 and the temperature and the use time recorded in the recording unit 702. The thermal degradation point in the thermal degradation model may refer to, for example, a point indicating a thermally degraded state using the physical property value of the rubber in the graph illustrated in FIG. 6.

A remaining lifetime prediction unit 440 sets a threshold for the physical property value of rubber forming the inner tubular rubber layer 11, as a limit of use of the inner tubular rubber layer 11, and predicts the remaining life of the hose in use based on the threshold and the thermal degradation point identified by the thermal degradation point identification unit 430.

According to the remaining lifetime prediction unit for the hose of the present embodiment, it is possible to easily predict the remaining lifetime of the hose, without requiring monitoring of both pressure and temperature of the hose in use nor without destroying the hose.

INDUSTRIAL APPLICABILITY

The hose remaining lifetime prediction methods and the hose remaining lifetime prediction systems according to the disclosure can be applied to hoses used, for example, in construction machinery, factory equipment, and the like.

REFERENCE SIGNS LIST 1 hose
2 joint
3 machinery
7 external equipment
11 inner tubular rubber layer
12 reinforcing layer
13 sheath layer
14 intermediate rubber layer
31 each-time use temperature measurement unit
32 information communication unit
40 server
41 database
42 thermal degradation model generation unit
43 reference temperature use time calculation unit
44 remaining lifetime prediction unit
45 information communication unit
50 terminal
60 network
100 first hose remaining lifetime prediction system
102 second hose remaining lifetime prediction system
103 third hose remaining lifetime prediction system
301 measurement unit
302 information communication unit
310 sensor unit
320 information communication unit
401 database
402 degraded state reaching use time calculation unit
403 thermal load calculation unit
404 remaining lifetime prediction unit
405 information communication unit
410 database
420 thermal degradation model generation unit
430 thermal degradation point identification unit
440 remaining lifetime prediction unit
450 information communication unit
701 information communication unit
702 recording unit

The invention claimed is:

1. A hose remaining lifetime prediction method, comprising:
a hose in use, the hose in use including at least an inner tubular rubber layer, a reinforcing layer disposed on an outer peripheral side of the inner tubular rubber layer, and a sheath layer disposed on an outer peripheral side of the reinforcing layer,
a temperature sensor for directly measuring a temperature of the inner tubular rubber layer,
obtaining in advance, for a hose of a same type as the hose in use, a relationship between a use time of the inner tubular rubber layer at a reference temperature and a physical property value of a rubber forming the inner tubular rubber layer, the physical property value being elongation at break, or strength at break of the rubber forming the inner tubular rubber layer, and generating a thermal degradation model for the inner tubular rubber layer;
calculating a reference temperature use time, for the hose in use, of the inner tubular rubber layer at the reference temperature until a time of prediction, wherein
the reference temperature is a temperature of reference that is determined for convenience in predicting a remaining lifetime of the hose in use;
the reference use time is calculated based on at least the temperature of the inner tubular rubber layer or the temperature of the fluid inside of the tank in communication with the inner tubular rubber layer as measured by the temperature sensor; and
predicting the remaining lifetime of the hose in use, based on a comparison between the reference temperature use time and the thermal degradation model.

2. The hose remaining lifetime prediction method according to claim 1, wherein in calculating the reference temperature use time, it further includes:
acquiring, for the hose in use, data on use temperature of the inner tubular rubber layer at a plurality of times until the time of the prediction; and
converting an accumulation of the data on use temperature at the plurality of times into the reference temperature use time.

3. The hose remaining lifetime prediction method according to claim 1, wherein
a threshold for the physical property value is set as a limit of use of the inner tubular rubber layer, and
the remaining lifetime, of the hose is use, is predicted to be a time from a time when the reference temperature use time has elapsed in the thermal degradation model to a time when use time at which the physical property value reaches the threshold has elapsed.

4. The hose remaining lifetime prediction method according to claim 3, wherein the threshold is determined according to a magnitude of a physical input to the hose in use.

5. The hose remaining lifetime prediction method according to claim 2, wherein
a threshold for the physical property value is set as a limit of use of the inner tubular rubber layer, and
the remaining lifetime is predicted to be a time from a time when the reference temperature use time has elapsed in the thermal degradation model to a time when use time at which the physical property value reaches the threshold has elapsed.

6. The hose remaining lifetime prediction method according to claim 5, wherein the threshold is determined according to a magnitude of a physical input to the hose in use.

* * * * *